US006735633B1

(12) United States Patent
Welch et al.

(10) Patent No.: US 6,735,633 B1
(45) Date of Patent: May 11, 2004

(54) SYSTEM FOR BANDWIDTH ALLOCATION IN A COMPUTER NETWORK

(75) Inventors: William Welch, San Francisco, CA (US); Steven McCanne, Berkeley, CA (US); Abhay K. Parekh, San Francisco, CA (US)

(73) Assignee: Fast Forward Networks, San Francisco, CA (US)

( * ) Notice: Subject to any disclaimer, the term of this patent is extended or adjusted under 35 U.S.C. 154(b) by 0 days.

(21) Appl. No.: 09/384,865

(22) Filed: Aug. 27, 1999

Related U.S. Application Data
(60) Provisional application No. 60/137,160, filed on Jun. 1, 1999.

(51) Int. Cl.[7] ............................................. G06F 15/16
(52) U.S. Cl. ...................................................... 709/233
(58) Field of Search ................................. 709/232–234, 709/246–247, 250; 370/231, 235, 235.1, 236

(56) References Cited

U.S. PATENT DOCUMENTS

| | | | |
|---|---|---|---|
| 5,835,495 A | | 11/1998 | Ferriere |
| 5,956,716 A | | 9/1999 | Kenner et al. ................ 707/10 |
| 6,003,030 A | | 12/1999 | Kenner et al. ................ 707/10 |
| 6,028,842 A | * | 2/2000 | Chapman et al. ........... 370/235 |
| 6,046,980 A | * | 4/2000 | Packer ........................ 370/230 |
| 6,052,718 A | | 4/2000 | Gifford ....................... 709/219 |
| 6,112,239 A | | 8/2000 | Kenner et al. .............. 709/224 |
| 6,263,371 B1 | * | 7/2001 | Geagan, III et al. ....... 709/231 |
| 6,412,000 B1 | * | 6/2002 | Riddle et al. ............... 709/224 |
| 6,449,650 B1 | * | 9/2002 | Westfall et al. ............. 709/228 |
| 6,463,470 B1 | * | 10/2002 | Mohaban et al. .......... 709/223 |
| 6,529,508 B1 | * | 3/2003 | Li et al. ...................... 370/392 |
| 6,535,486 B1 | * | 3/2003 | Naudus et al. ............. 370/235 |

FOREIGN PATENT DOCUMENTS

CA  PCT/CA97/00936   12/1997

OTHER PUBLICATIONS

U.S. International Searching Authority; International Search Report; Nov. 9, 2000; six (6) pages.
Deering, S. and Cheriton, D., "Multicast Routing in Datagram Internetworks and Extended LANs," *ACM Transactions on Computer Systems*, vol. 8, No. 2, May 1990, pp. 85–110.
Maffeis, S., Bischofberger, W.R., and Mätzel, K. –U., "GTS: A Generic Multicast Transport Service," *UBILAB Technical Report*, 94.6.1, 1994, pp. 1–7.
Bormann, C., Ott, J., Gehrcke, H.C., Kerschat, T., and Seifert, N., "Mtp–2: Towards achieving the S.E.R.O. Properties for Multicast Transport," International Conference on Computer Communications Networks, (San Francisco, California), Sep. 1994.

(List continued on next page.)

*Primary Examiner*—Andrew Caldwell
(74) *Attorney, Agent, or Firm*—Townsend and Townsend and Crew, LLP; Philip H. Albert

(57) ABSTRACT

A system for classifying, monitoring, controlling and otherwise managing and allocating bandwidth of a network to data streams. A method for allocating bandwidth of a data network to a plurality of data streams is provided. The method comprises specifying apportionment of the bandwidth to a plurality of data classes. Receiving a plurality of data streams wherein each data stream has an associated data class. Negotiating a transfer rate for each data stream, wherein the transfer rate is limited to the bandwidth apportioned to the data class associated with each data stream and transmitting the data streams on the data network at the negotiated transfer rates.

17 Claims, 13 Drawing Sheets

OTHER PUBLICATIONS

Parsa, M., and Garcia–Luna–Aceves, J., "Scalable Internet Multicast Routing," Proceedings of ICCCN 95, (Las Vegas, Nevada), Sep. 1995.

Thyagarajan, A.S., and Deering, S.E., Hierarchical Distance–Vector Multicast Routing for the MBone, Sigcomm '95, (Cambridge, Massachusetts), Aug. 1995.

Yavatkar, R., Griffioen, J. and Sudan, M., A Reliable Dissemination Protocol for Interactive Collaborative Applications, ACM Multimedia 1995 (San Francisco, California) Nov. 1995.

Amir, E., McCanne, S., and Zhang, H., "An Application Level Video Gateway." ACM Multimedia 1995 (San Francisco, California) Nov. 1995.

Lin, J.C., and Paul, S., "Rmtp: A Reliable Multicast Transport Protocol," IEEE INFOCOM '96, pp. 1–19.

Deering, S., Estrin, D., Farinacci, D., Jacobson, V., Liu, C., and Wei, L., "The PIM Architecture for Wide–Area Multicast Routing," *IEEE/ACM Transactions on Networking*, vol. 4, No. 2, Apr. 1996, pp. 153–162.

Atwood, J.W., Catrina, O., Fenton, J., and Strayer, W. Timothy, "Reliable Multicasting in the Xpress Transport Protocol," Proceedings of the 21$^{st}$ Local Computer Networks Conference (Minneapolis, Minnesota) Oct. 13–16, 1996.

Perkins, C., and Crowcroft, J., Real–Time Audio and Video Transmission of IEEE GLOBECOM '96 Over the Internet, *IEEE Communications Magazine*, vol. 35, Apr. 1997, pp. 30–33.

Sharma, P. Estrin, D., Floyd, S. and Jacobson, V., "Scalable Timers for Soft State Protocols," Proceedings IEEE Infocom '97 (Kobe, Japan) Apr. 1997.

Mittra, S., "Iolus: A Framework for Scalable Secure Multicasting," *ACM Computer Communication Review*, vol. 27, Oct. 1997, pp. 277–288.

Hodel, H., "Policy Tree Multicast Routing: An Extension to Sparse Mode Source Tree Delivery," ACM Computer Communication Review, vol. 28, No. 2, Apr. 1998, pp. 78–97.

Kumar, S., Radoslavov, P, Thaler, D., Alaettinoglu, C., Estrin, D., and Handley, M., "The MASC/BGMPL Architecture for Inter–Domain Multicast Routing," SIGCOMM '98 (Vancouver, Canada) Sep. 1998.

Decasper, D., Dittia, Z., Parulkar, G., Plattner, B. "Router Plugins: A Software Architecture for Next Generation Routers," ACM SIGCOMM '98 (Vancouver, Canada) Sep. 1998.

Handley, M., Crowcroft, J., Bormann, C., Ott, J., "Very Large Conferences on the Internet: The Internet Multimedia Conferencing Architecture," Computer Networks, vol. 31, No. 3, 1999, pp. 191–204.

Holbrook, H. and Cheriton, D.R., "IP Multicast Channels: EXPRESS Support for Large–Scale Single–Source Applications," Computer Communication Review, vol. 29, No. 4, Oct. 1999.

Farinacci, D., Lin, A., Speakman, T., and Tweedly, A., "Pretty Good Multicast (PGM) Transport Protocol Specification," Internet Draft, Internet Engineering Task Force, Jan. 1998.

Farinacci, D., Wei, L., and Meylor, J., "Use of Anycast Clusters for Inter–Domain Multicast Routing," Internet Draft, Internet Engineering Task Force, Mar. 1998.

Robertson, K., Miller, K., White, M., and Tweedly, A., "StarBurst Multicast File Transfer Protocol (MFTP) Specification," Internet Draft, Internet Engineering Task Force, Apr. 1998.

Bannerjea, A. Faloutsos, M., and Pankaj, R., "Designing QoSMIC: A Quality of Service Sensitive Multicast Internet Protocol," Internet Draft, Internet Engineering Task Force, May 1998.

Thaler, D., Estrin, D., Meyer, D., "Border Gateway Multicast Protocol (BGMP): Protocol Specification," Internet Draft, Nov. 1998.

Casey, L., Cunningham, I., and Eros, R., "IP VPN Realization Using MPLS Tunnels," Internet Engineering Task Force, Nov. 1998.

Finlayson, R., "A More Loss–Tolerant RTP Payload Format for MP3 Audio," Internet Draft, Jan. 1999.

Finlayson, R. "IP Multicast and Firewalls," Internet Draft, May 1999.

Blazevic, L. and Le Boudec, J., "Distributed Core Multicast (DCM): A Routing Protocol for Many Small Groups with Application to Mobile IP Telephony," Internet Engineering Task Force, Jun. 1999.

Hampton, D., Oran, D., Salama, H., and Shad, D., The IP Telephony Border Gateway Protocol (TBGP), Internet Engineering Task Force, Jun. 1999.

Finlayson, R. "The UDP Multicast Tunneling Protocol," Internet Draft, Jul. 1999.

Malis, A., Heinanen, J., Armitage, G., Gleeson, B., "A Framework for IP Based Virtual Private Networks Internet Draft," Aug. 1999.

Waitzman, D., Partridge, C., Deering, S. E., "Distance Vector Multicast Routing Protocol," Request For Comments RFC 1075, Nov. 1988.

Hanks, S., Li, T., Farinacci, D., and Traina, P., "Generic Routing Encapsulation," Request for Comments RFC 1701, Oct. 1994.

Farinacci, D., Hanks, S., Li, T., and Traina, P., "Generic Routing Encapsulation Over IPv4 Networks," Request For Comments RFC 1702, Nov. 1994.

Schulzrinne, H., Casner, S., Frederick, R., Jacobson, V., "RTP A Transport Protocol for Real–Time Applications," Request for Comments RFC 1889, Jan. 1996.

Fenner, W., "Internet Group Management Protocol," Version 2, RFC 2236, Nov. 1997.

Ballardie, A., "Core Based Trees (CBT) Multicast Routing Architecture," Request for Comments, RFC 2201, Sep. 1997.

Estrin, D., Farinacci, D., Helmy, A., Thaler, D., Deering, S., Handley, M., Jacobson, V., Liu, C., Sharma, P, and Wei, L., "Protocol Independent Multicast–Sparse Mode (PIM–SM)," Request for Comments, RFC 2362, Jun. 1998.

Arango, M., Dugan, A., Elliott, I, Huitema, C., and Pickett, S., "Media Gateway Control Protocol (MGCP) Version 1.0," RFC 2705, Oct. 1999.

* cited by examiner

| STREAM IDENTIFIER 702 | NAME TAG 704 | VALUE 706 |
|---|---|---|
| 239.2.3.4 (502) | MEDIATYPE<br>AUTHOR<br>TITLE<br>RATING (708) | NETSHOW<br>THOMPSON<br>FEAR AND LOATHING<br>G (710) |
| 239.33.88.2 (504) | MEDIATYPE<br>AUTHOR<br>TITLE<br>ADVERTISEMENT CLASS<br>DURATION | G2<br>CBS SPORTS<br>PENGUINS AND DUCKS<br>S<br>2:30:00 (712) |

*FIG. 8.*

SYSTEM FOR BANDWIDTH ALLOCATION IN A COMPUTER NETWORK

CROSS REFERENCES TO RELATED APPLICATIONS

This application claims priority from a provisional patent application filed on Jun. 1, 1999 as Ser. No. 60/137,160. This application is related to U.S. Patent Application entitled "PERFORMING MULTICAST COMMUNICATION IN COMPUTER NETWORKS BY USING OVERLAY ROUTING filed Jun. 1, 1999 Ser. No. 09/323,869, now U.S. Pat. No. 6,611,872, and to U.S. Provisional Application "SYSTEM FOR MULTIPOINT INFRASTRUCTURE TRANSPORT IN A COMPUTER NETWORK" filed Jun. 1, 1999 as Ser. No. 60/137,153. Each of these applications are hereby incorporated by reference as if set forth in full in this document.

FIELD OF THE INVENTION

This invention relates generally to the operation of a data network, and more particularly, to the allocation of bandwidth of a data network to a plurality of data streams.

BACKGROUND OF THE INVENTION

Networks need to efficiently use their bandwidth, especially when broadcasting high-bandwidth information. Broadcast information is typically characterized by a relatively small number of data sources transmitting data to a large number of destinations, such as end-users or clients. For example, the audio signal from an FM radio station may be digitized and broadcast over a public data network, like the Internet, thereby allowing a large number of end-users around the world to receive the digital broadcast.

A subset of broadcasting, known as multicasting, occurs when a broadcast is intended to be received by a selected set of clients. Unfortunately, current approaches have failed to achieve efficient multicasting over large data networks. Part of the reason for this failure is the lack of a scalable infrastructure to handle subscriptions, distribution and control of the multicast information.

Likewise, when a large number of time-critical unicast connections are multiplexed together over a network, for instance, to support voice over IP or on-demand streaming media, the network must efficiently deliver these streams and retain the best possible delivered quality even when the offered load exceeds the bandwidth of the intervening network links.

FIG. 1 shows a network portion 100 of a typical data network. The network portion 100 comprises nodes 102, 104 and 106 coupled together by links 108 and 110. All the links of network portion 100 can be considered bi-directional links allowing both the transmission and reception of information. An information source 112 is coupled to node 102 by link 114. Clients 116, 118 and 120 are coupled to node 106 by links 122, 124 and 126, respectively. Links 128, 129, 130, 132 and 134 are coupled to other portions of the data network (not shown).

In a typical mode of operation, information source 112 forwards information to node 102 for distribution throughout the data network. The information is in the form of data packets where a series of data packets forms a data stream. For example, a data stream destined for client 118 would travel from node 102 to node 104, then to node 106 and finally to client 118. Each node receives the data packets of the data stream and forwards them in an output stream to the next node. In this manner, data streams may be distributed around the network from a source to a destination using a number of different data paths.

Unfortunately, transmission problems can occur because of the way a node forms its output stream. One problem concerns the issue of bandwidth allocation, since each link has only a fixed amount of bandwidth. In current networking schemes, if traffic backs up at a node, due to outbound congestion, some of the incoming packets will be dropped, and as a result, the quality of the data streams will be degraded.

One situation where a bandwidth limitation is especially critical is during the transmission of real-time data streams. Real-time data streams comprise video, audio or other types of data streams where the quality received by the client will degrade if the stream is interrupted. For example, if a real-time video stream transmitted to client 118 loses data packets due to a bandwidth limitation of link 108, the quality of the data stream received by client 118 will be degraded. The client 118 will perceive the real-time video as having pauses, jumps or skips accompanied by glitches in the sound portion. As a result, client 118 may not want to receive such a degraded video stream.

SUMMARY OF THE INVENTION

The present invention provides a system for classifying, monitoring, controlling and otherwise managing and allocating bandwidth to data streams in a data network. The invention can be used in any network environment including, but not limited to, unicast networks, broadcast networks or other network environments where efficient use of network bandwidth is desired.

In one embodiment, a method for allocating bandwidth of a data network to a plurality of data streams is provided. The method comprises: specifying apportionment of the bandwidth to a plurality of data classes; receiving a plurality of data streams wherein each data stream has at least one attribute that associates the data stream with a data class; negotiating a transfer rate for each data stream, wherein the transfer rate is limited to the bandwidth apportioned to the data class associated with each data stream; and transmitting the data streams on the data network at the negotiated transfer rates.

In another embodiment, apparatus is provided for allocating bandwidth of a data network to a data stream wherein the data stream has stream annotations. The apparatus comprises a plug-in having logic to receive the data stream and to determine a plurality of transfer rates. The plug-in also has logic to transform the data stream into a transformed stream having a transfer rate selected from one of the plurality of transfer rates. An allocator is coupled to the plug-in and has logic to receive the data stream. The allocator has a policy tree that specifies apportionment of the bandwidth to a plurality of data classes. The allocator also has logic to associate the data stream with a data class based on the stream annotations and to negotiate with the plug-in to select the transfer rate from the plurality of transfer rates, wherein the transfer rate is limited to the bandwidth allocated by the policy tree to the data class. An output link is coupled to the plug-in and has logic to transmit the transformed stream on the data network at the transfer rate.

In another embodiment, a method of operating a data network to allocate bandwidth of the data network to a data stream is provided. The method comprises: annotating the data stream with stream annotations representative of a data class; establishing a policy tree that specifies apportionment of the bandwidth of the data network to a plurality of data classes; determining the data class of the data stream based on the stream annotations and negotiating a transfer rate for the data stream limited to the bandwidth specified by the policy tree for the data class; transforming the data stream to a transformed stream having the transfer rate; and transmitting the transformed stream on the data network at the transfer rate.

BRIEF DESCRIPTION OF THE DRAWINGS

FIG. 8 show a table 700 representative of control information for use with the present invention;

DESCRIPTION OF THE SPECIFIC EMBODIMENTS

The present invention provides a system for classifying, monitoring, controlling and otherwise managing and allocating bandwidth to media streams in a data network. Transmission rates for the media streams are selected with respect to a fixed but administratively configurable policy, so that the available bandwidth of the data network can be efficiently utilized.

Figure 1:
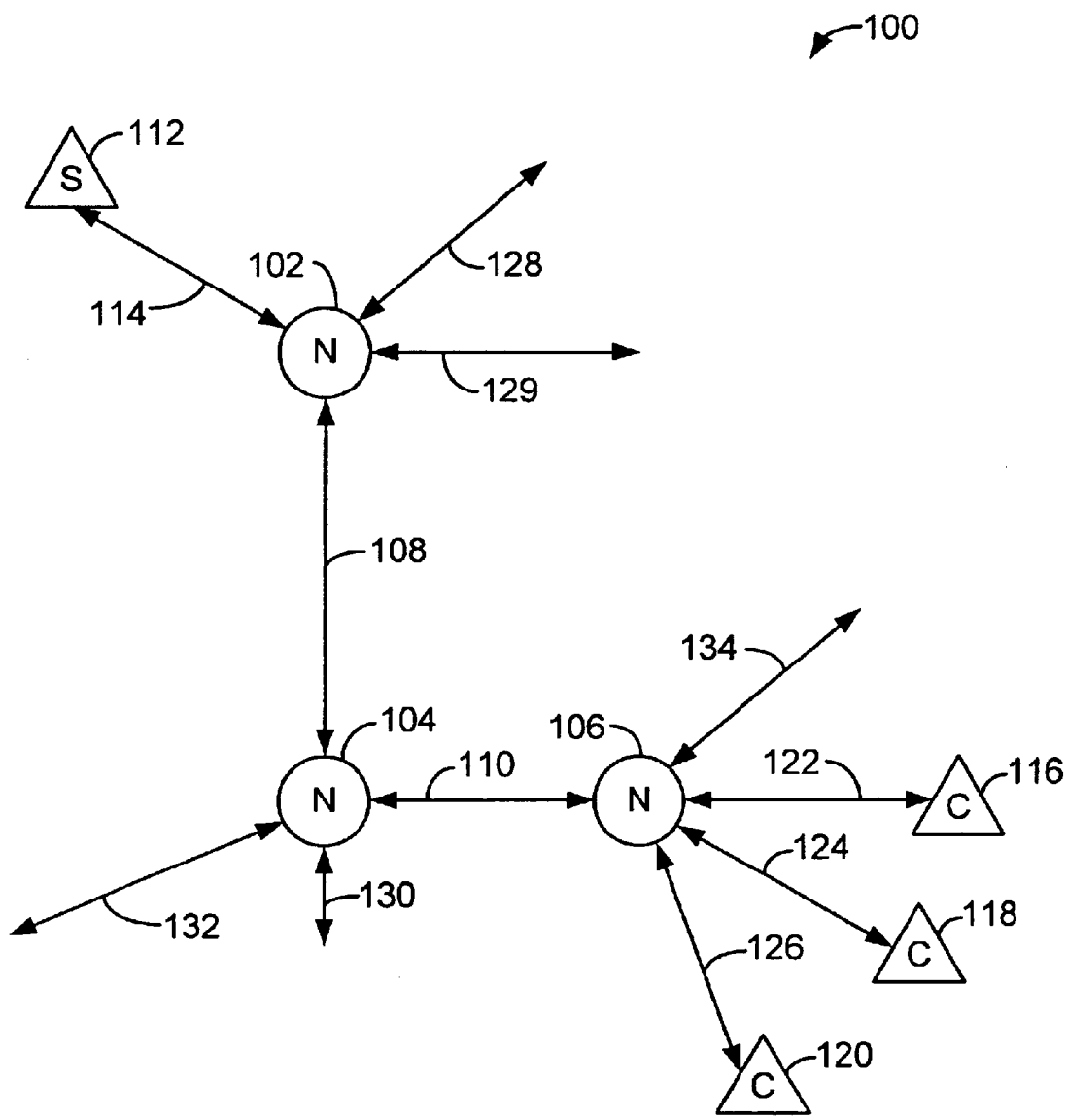
FIG. 1 shows a prior art network portion 100.
Figure 2:
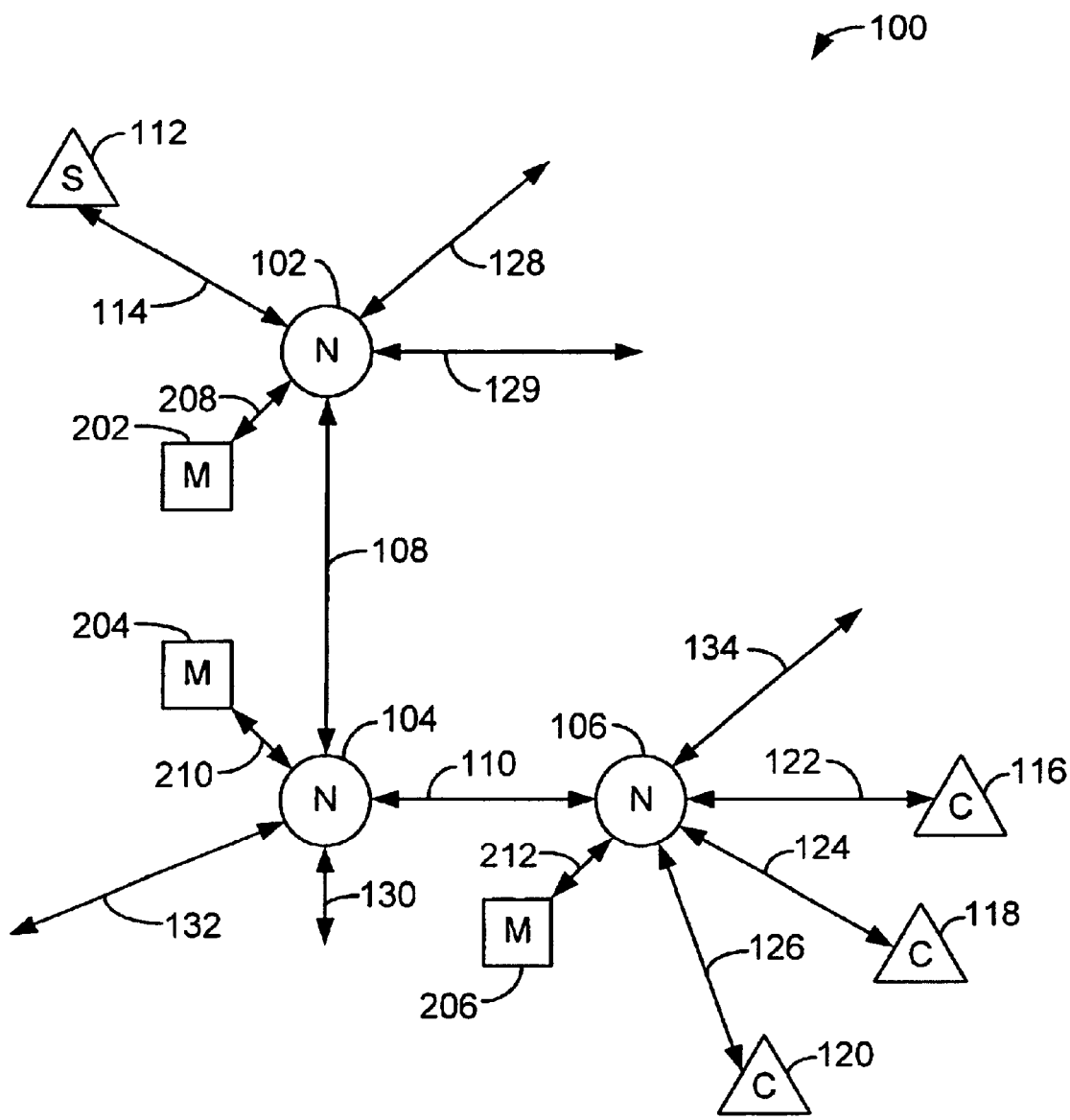
FIG. 2 shows a network configuration incorporating an embodiment of the present invention.

FIG. 2 shows the network portion 100 of FIG. 1 and further comprises media devices 202, 204 and 206 coupled to nodes 102, 104 and 106, by links 208, 210 and 212 respectively. The media devices are used to form a virtual network such as an overlay network as described in the above identified patent application having Ser. No. (09/323, 869). The media devices function to forward data streams around the data network in a way that maintains bandwidth allocations for the data streams. This is accomplished by dedicating at least a portion of the available bandwidth of the data network to the virtual overlay network formed by the media devices. As a result, clients receive real-time data streams without interruption and with excellent quality. A description of the formation of the virtual overlay network is beyond the scope of this invention, however specific details can be found in the above identified patent application having Ser. No. (09/323,869).

The media devices couple to their respective nodes to receive data streams arriving from any other links coupled to the node. For example, media device 202 receives data streams from links 114, 128, 129 and 108. The links that couple the media devices to the nodes provide both input and output transmission paths. After receiving the arriving data streams, the media devices form output data streams for transmission on the data network.

Figure 3:
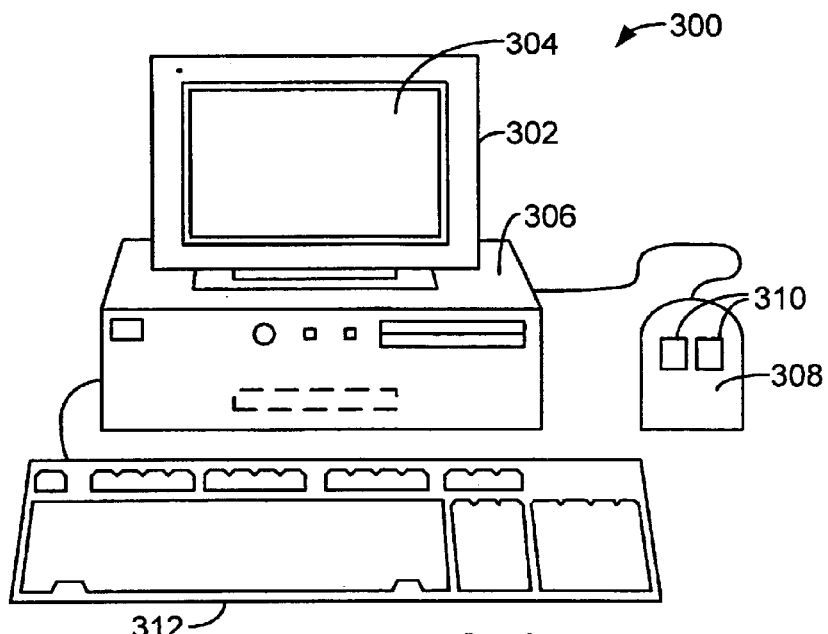
FIG. 3 shows a computer device 300 suitable to implement an embodiment of the present invention.

FIG. 3 shows a computer device 300 suitable for use as a media device in accordance with the present invention. Computer device 300 includes display 302 having display screen 304. Cabinet 306 houses standard computer components (not shown) such as a disk drive, CDROM drive, display adapter, network card, random access memory (RAM), central processing unit (CPU), and other components, subsystems and devices. User input devices such as a mouse 308 having buttons 310, and a keyboard 312 are shown. Other user input devices such as a trackball, touch-screen, digitizing tablet, etc. can be used. In general, the computer device 300 is illustrative of one type of computer system, such as a desktop computer, suitable for use with the present invention. Computers can be configured with many different hardware components and can be made in many dimensions and styles (e.g., laptop, palmtop, server, workstation, mainframe). Any hardware platform suitable for performing the processing described herein is suitable for use with the present invention. For example, although FIG. 2 shows media devices 202, 204 and 206 coupled to nodes 102, 104 and 106, respectively, the functions and processing of the media devices may be incorporated directly into the nodes.

Figure 4:
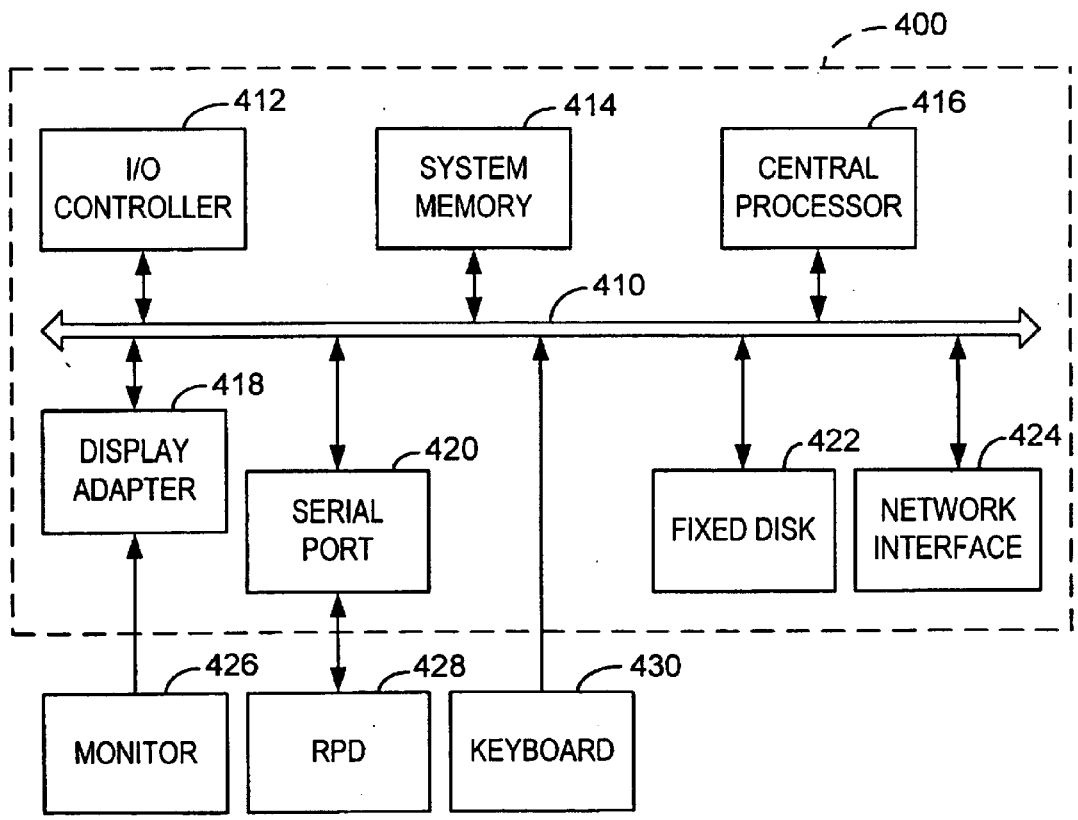
FIG. 4 shows the internal architecture of the computer device of FIG. 3.

FIG. 4 illustrates subsystems that might typically be found in a computer device such as computer device 300. Subsystems within box 400 are directly interfaced to an internal bus 410. Such subsystems typically are contained within the computer system, such as within the cabinet 306 of FIG. 3. Subsystems include input/output (I/O) controller 412, System Random Access Memory (RAM) 414, Central Processing Unit (CPU) 416, Display Adapter 418, Serial Port 420, Fixed Disk 422 and Network Interface Adapter 424. The use of the bus 410 allows each of the subsystems to transfer data among the subsystems and, most importantly, with the CPU 416. External devices can communicate with the CPU or other subsystems via the bus 410 by interfacing with a subsystem on the bus. Monitor 426 connects to the bus through Display Adapter 418. A relative pointing device (RPD) 428 such as a mouse connects through Serial Port 420. Some devices such as keyboard 430 can communicate with the CPU 416 by direct means without using the main data bus as, for example, via an interrupt controller and associated registers (not shown).

As with the external physical configuration shown in FIG. 3, many subsystem configurations are possible. FIG. 4 is illustrative of one suitable configuration. Subsystems, components or devices other than those shown in FIG. 4 can be added. A suitable computer system can be achieved without using all of the subsystems shown in FIG. 4. Other subsystems such as a CDROM drive, graphics accelerator, etc. can be included in the configuration without affecting the performance of the system of the present invention.

Figure 5:
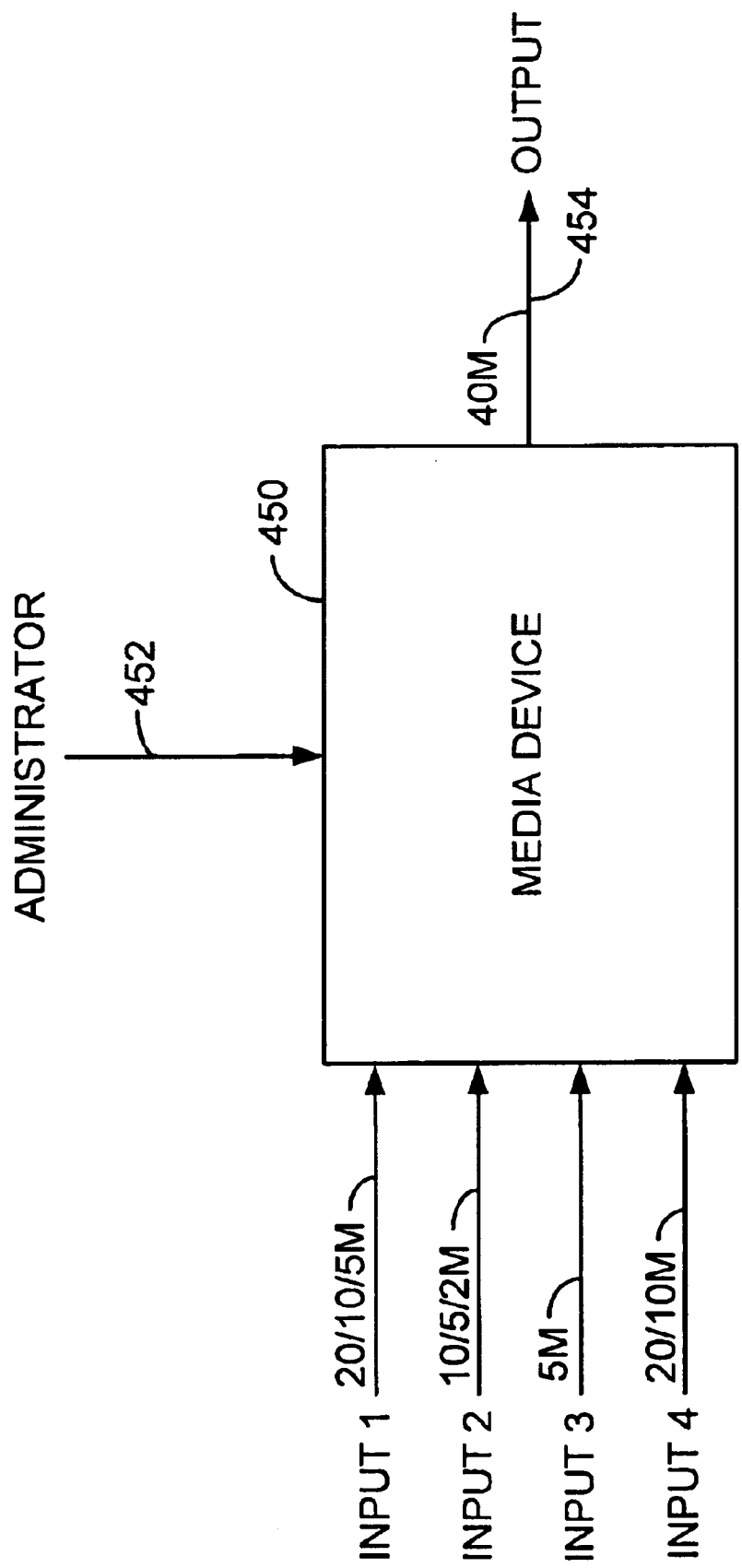
FIG. 5 shows a block diagram of a media device 450 constructed in accordance with the present invention.

FIG. 5 shows a block diagram of a media device 450 that operates in accordance with the present invention. The media device 450 is suitable for use as one of the media devices 202, 204 or 206 in the data network of FIG. 2. The device 450 has four inputs 1–4, a control input 452, and an output 454. One or more data streams arrive at the device 450 via the four inputs 1–4. For purposes of convenience, it will be assumed that only one data stream arrives on each of the four inputs. However, the device 450 can be configured to have only one input at which multiple data streams arrive, alternatively, the device 450 can be configured to have multiple inputs where one or more data stream arrive on each input. Each of the four data streams are routed to the output 454 for transmission on the network. The output 454 has a transmission limit which represents the maximum transmission capacity available to the device 450 at the output 454. The transmission capacity may be limited for a variety of reasons. For example, the transmission capacity may be a physical capacity limitation or can result because the data network has restricted the output to this capacity limitation to regulate network usage. Another way the transmission capacity of the output may be limited can occur when a system administrator downloads instructions via the control input 452 to limit the output to a specific transmission capacity. As a result, the device 450 operates to allocate the available output bandwidth to the input data streams in a way that follows administrative instructions and bandwidth limitations.

Each of the four input data streams can be transmitted on the data network at one or more transmission rates. The selection of transmission rates is done by the device 450 and depends on the type of data in the data streams. For example, a data stream containing video images may be transmitted at one of several transmission rates wherein differences in the quality of the video images result from the selection of the transmission rate. A data stream containing programs or data files may be transmitted at any number of transmission rates without degrading the information. The flexibility to transmit data streams at one of several rates allows the device 450 to select transmission rates for the data streams to achieve specific network goals, such as optimizing efficiency, implementing stream priorities or to accommodate specific administrative requirements. For example, referring to the representative data streams of FIG. 5, input 1 can be transmitted at 20, 10 or 5 megabits per second (20/10/5 m), while input 2 can be transmitted at 10, 5 or 2 megabits per second (10/5/2 m). Thus, during operation, the device 450 can select transmission rates for each of the input data streams from the known available transmission rates, and thereby allocate the available network bandwidth at the output 454 to the input data streams.

Accordingly, one method for the device to select a transmission rate for an input data stream uses bandwidth allocation parameters. The bandwidth allocation parameters are received when a system administrator, or some other system or external computer program, uses the control input 452 to input the bandwidth allocation parameters into the device 450. The allocation parameters define allocation of the available output bandwidth to selected "data classes." A data class defines one or more "types" of data streams. For example, a live video data stream is one type of data stream and a data stream containing data files is another type of data stream. A data stream may also have sub-types. For example, a news broadcast and a weather broadcast are sub-types of live video data streams. Thus, a data class can specify any combination of types and/or sub-types of data streams. The device 450 first determines the type of data stream, and thus the class, from control information associated with the data stream. The available transmission rates for forwarding the data stream are also determined. The device then selects one of the available transmission rates for the data stream which conforms to the bandwidth allocation for that particular class of data stream. For example, if input 1 carries a data stream of class "video", while input 2 carries a data stream of class "audio", a transmission rate for each of the data streams is selected based on the allocation parameters. As a result, a transmission rate for input 1 is selected to conform to the bandwidth allocation for class "video" and a transmission rate for input 2 is selected to conform to the bandwidth allocation for class "audio." Therefore, the allocation parameters can be used to allocate the available output bandwidth to specific types of incoming data streams. As will be shown, a number of bandwidth allocation methods and dynamic re-allocation methods are possible without deviating from the scope of the present invention.

In one method of operation, the device 450 allocates the output bandwidth among all the input streams, so that all the input streams will be forwarded on the network. For example, assuming that the output capacity limitation at the output 454 is 40 m and the four input data streams have possible transmission rates at shown in FIG. 5, then in one allocation scheme, the transmission rates may be selected so that input 1 is 20 m, input 2 is 5 m, input 3 is 5 m and input 4 is 10 m. Thus, the 40 m available at the output 454 would be fully utilized. In another allocation scheme, the control input may be used to input allocation parameters that allocate higher bandwidth to specific classes of data streams. For example, if the types of data streams at input 2 and input 4 are in the class allocated high bandwidth, a new allocation may result wherein the transmission rates are selected so that input 1 is 5 m, input 2 is 10 m, input 3 is 5 m and input 4 is 20 m. Thus, the highest available transmission rates are selected for the data streams at inputs 2 and 4 corresponding to 10 m and 20 m, respectively, while the data streams at inputs 1 and 3 have transmission rates that divide the remaining 10 m of available output bandwidth. All manner of bandwidth allocations may be achieved by using the allocation parameters to select the appropriate transmission rates for the input data streams. Situations may even occur wherein one or more input streams are not forwarded on the network due to the settings of the allocation parameters. For example, based on one set of allocation parameters, the transmission rates for inputs 1 and 4 may be selected to be 20 m each, thereby fully utilizing the available output bandwidth of 40 m. In this case, the data streams at inputs 2 and 3 would be lost, while the data streams at inputs 1 and 4 would be forwarded at their highest available transmission rates.

Figure 6A:
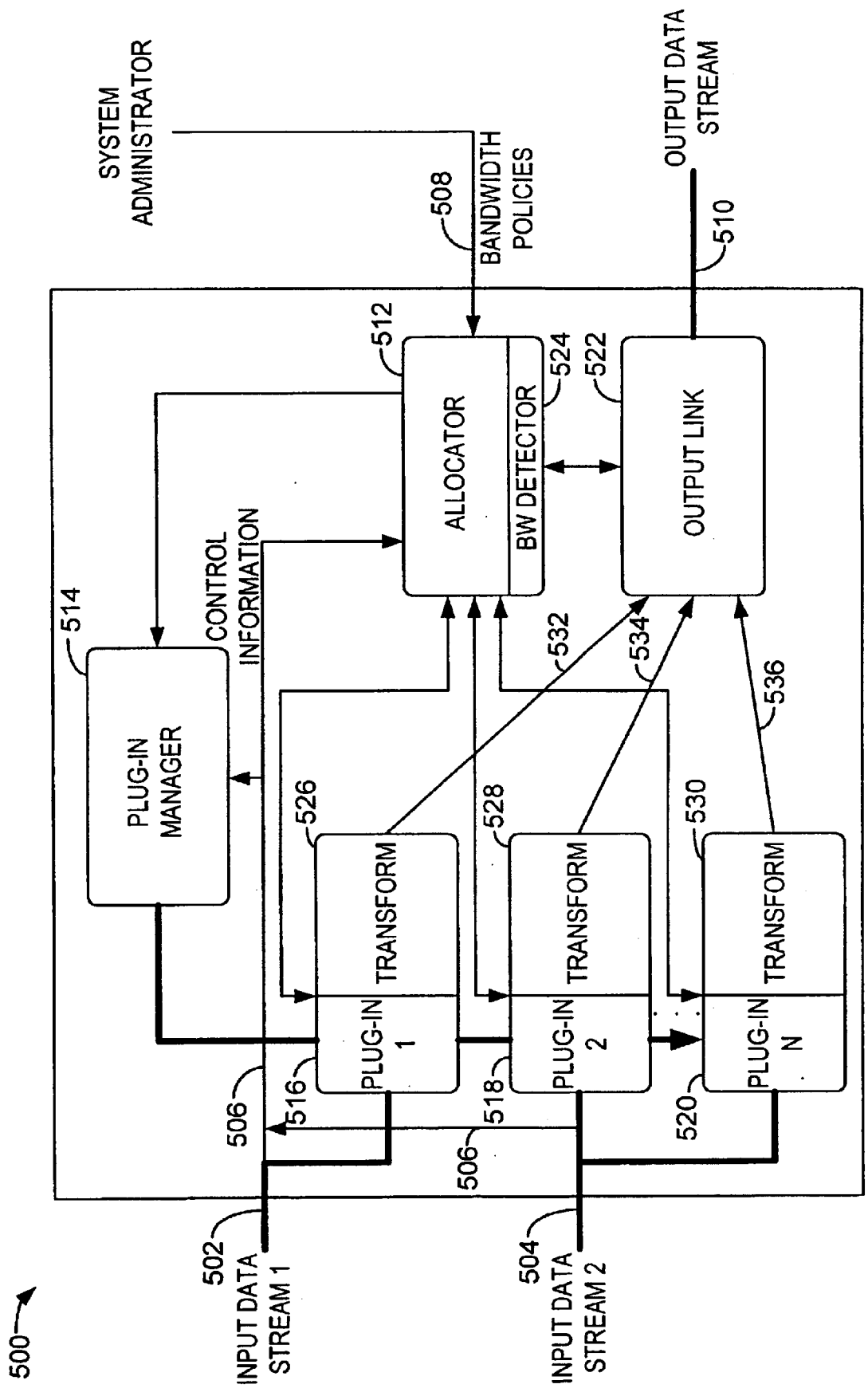
FIG. 6A shows a detailed block diagram of a bandwidth allocation device 500 constructed in accordance with the present invention.

FIG. 6A shows a detailed block diagram of a bandwidth allocation device 500 constructed in accordance with the present invention. The device 500 accepts a plurality of input data streams that comprise data representative of a variety of subject matter content. For example, an input data stream may comprise video data such as a movie or television broadcast or real-time information such as news reports or weather forecasts. A data stream may also comprise typical computer data such as programs and/or data files. A first input data stream 502 and a second input data stream 504 are input to the device 500. The first input data stream 502 comprises only one data stream, for example, a data stream representing a video broadcast. The second input data stream 504 comprises a multiplexed data stream comprising up to N different data streams. The data streams contain control information 506 which describes different parameters of the data streams. For example, the control information may have information about the origin or destination of the data streams. The control information may also contain information about the content of the data streams. For example, the author's name, type of broadcast or the duration of the broadcast. The control information 506 may form a part of the data stream, or the control information may be transmitted in a separate control data stream that arrives at the bandwidth allocation device 500 on one or more inputs or via a separate control channel.

The allocation parameters represent a set of bandwidth policies 508 that are provided to the device 500 from a system administrator or some other administrative source. The bandwidth policies are used to allocate the bandwidth of the data network available at output 510 of the device 500. The goal of the bandwidth policies is to achieve a desired allocation of the available output bandwidth among the classes of input data streams. For example, it may be desirable to give higher bandwidth to the first data stream 502, representing video data, so that transmission of this stream will result in high quality video images when received. The bandwidth policies 508 allow for dynamic allocation of the available output bandwidth so that as different classes of input data streams arrive or terminate, or as the requirements of an existing class of data stream changes, the bandwidth allocation can dynamically change. Utilizing the bandwidth policies 508, the device 500 can respond to a variety of changing network conditions to re-allocate the available output bandwidth as required.

To process the incoming data streams, an allocator 512 receives the control information 506 associated with the incoming data streams. The allocator also receives the bandwidth policies 508 from the system administrator. Alternatively, the allocator may receive the bandwidth policies from an automated management system that operates either inside or outside the disclosed system. The bandwidth policies 508 are designed by to implement bandwidth preferences and, for example, can be represented as a policy tree having a hierarchical structure. An exemplary policy tree is discussed in detail with reference to FIG. 7. The bandwidth policies, which are not restricted to having a tree structure, may have any structure which relates bandwidth to arbitrary data stream attributes, data stream types, or data stream classes. The policy tree defines static policies that are used by the allocator 512 to allocate the bandwidth of the data network based on the types of data streams currently being received.

A plug-in manager 514 also receives the control information 506. The plug-in manager 514 analyzes the received control information and activates plugins to process the incoming data streams. A plug-in refers to software and/or hardware running on the media device and having the capability of performing various processes on an incoming data streams. Each plug-in is created and specifically designed to receive the data of a specific type of data stream. For example, a plug-in may be created to handle layered video data or a plug-in may be created to handle non real-time computer data. In the embodiment of FIG. 6A, first and second plug-ins 516, 518 and up to the $N^{th}$ plug-in 520, are activated by the plug-in manager 514 to receive and process specific types of incoming data streams.

Depending on the type of data stream and/or the attributes that accompany the data stream, the plug-ins will determine one or more transmission rates that can be used for forwarding the data stream on the network. Once the available transmission rates are determined, the plug-ins negotiate with the allocator 512 to select one transmission rate that can be used to forward their respective data stream on the network. During the negotiation process, the plug-ins provide indications of the available rates for the data stream to the allocator. The allocator 512 responds to the plug-in by indicating which rate should be used. The allocator 512 uses the control information associated with each stream in conjunction with the bandwidth policies to select a negotiated transmission rate for each data stream. The negotiated transmission rate is selected from the available rates determined by the plug-in. By adhering to the bandwidth policies provided by the system administrator, the allocator is able to maximize the efficiency and utilization of the available network bandwidth by negotiating preferred transmission rates for each type of data stream, while conforming to the available capacity limitations available at the output.

At the completion of the rate negotiation, the plug-ins transform the data of the incoming data streams to the negotiated transmission rates, via transformers 526, 528, and 530, thereby forming transformed streams as shown at 532, 534 and 536. To accomplish this, the plug-ins use transformation processes to transform the input data streams, to the transformed data streams having the negotiated transmission rates. In one embodiment, the transformation process might simply select a subset of the layers that comprise a multibitrate signal to form the transformed data stream. In another embodiment, the transformation process might decode the signal and re-encode it with alternative compression parameters to decrease the bit rate at the cost of lower signal quality at the receiver. The transformed data streams are coupled to an output link 522 where the streams are combined to form an output data stream 510. The output data stream 510 comprises the input data streams at the negotiated transmission rates. The transformed data streams comprise streams of data packets being pushed out of the plugins. The output link 522 has logic to receive data packets from the plugins and also includes logic to combine the data packets into the output data stream 510. The output data stream 510 is forwarded to end users or to other routing devices in the network. Other routing devices in the network may be identical to the bandwidth allocation device 500 wherein the same or another set of bandwidth policies apply. Thus, it is possible that a data stream having a first negotiated transmission rate at one bandwidth allocation device may have a different negotiated transmission rate at other bandwidth allocation devices in the network.

Figure 6B:
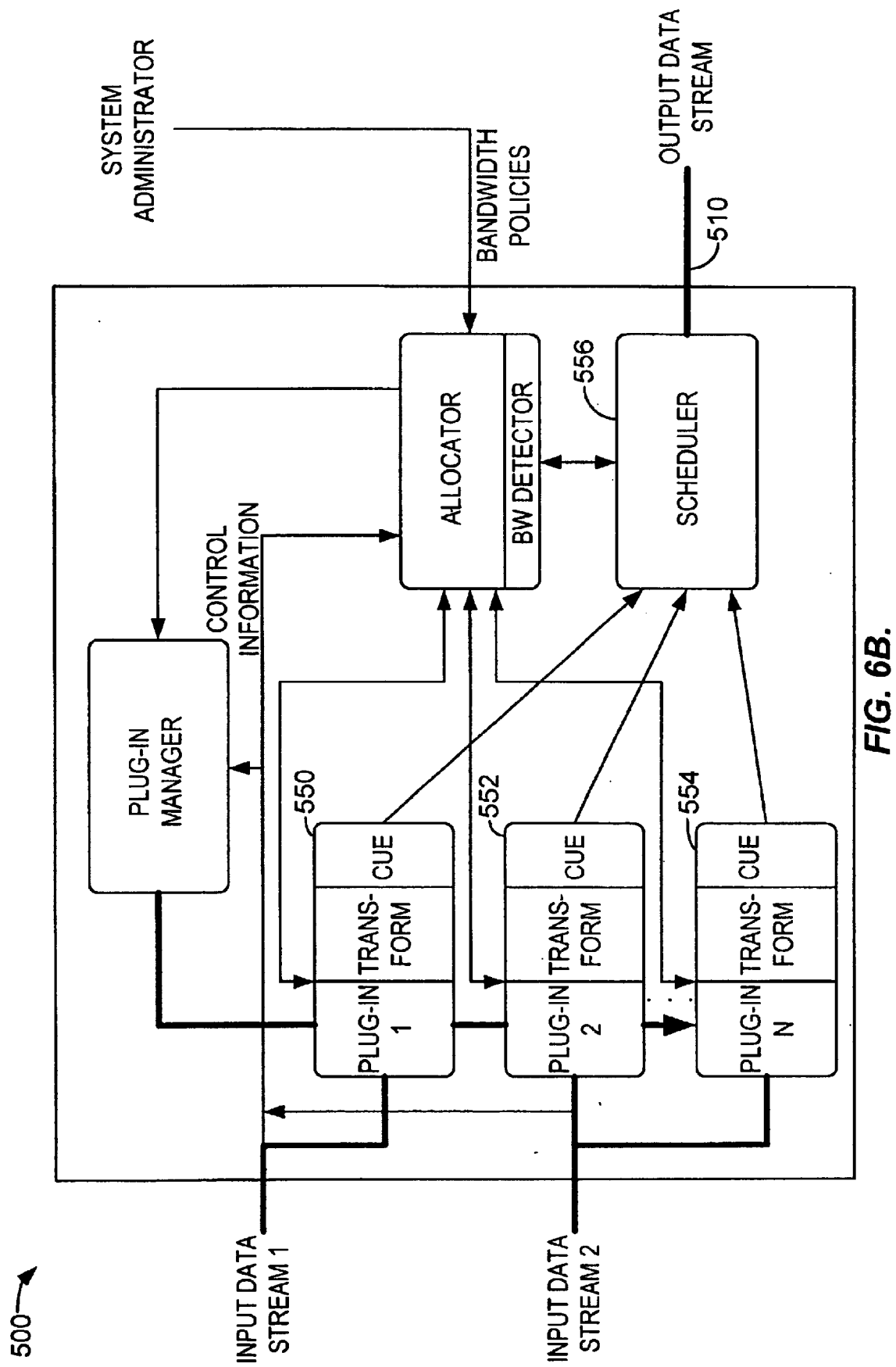
FIG. 6B shows another embodiment of a detailed block diagram of the bandwidth allocation device 500 constructed in accordance with the present invention.

FIG. 6B shows another embodiment of the bandwidth allocation device 500. In the embodiment of FIG. 6B, each of the plugins has an output queue as shown at 550, 552 and 554. The output link 522 is replaced with a packet scheduler 556. The scheduler 556 polls the output queues to pull data packets out of the plugins and thereby form the output stream 510. Regardless of whether the bandwidth allocation device 500 uses the output link 522 or the packet scheduler 556, the output data stream 510 contains the input data streams having transmission rates derived from the bandwidth allocations defined by the bandwidth policies of the policy tree.

Figure 7:
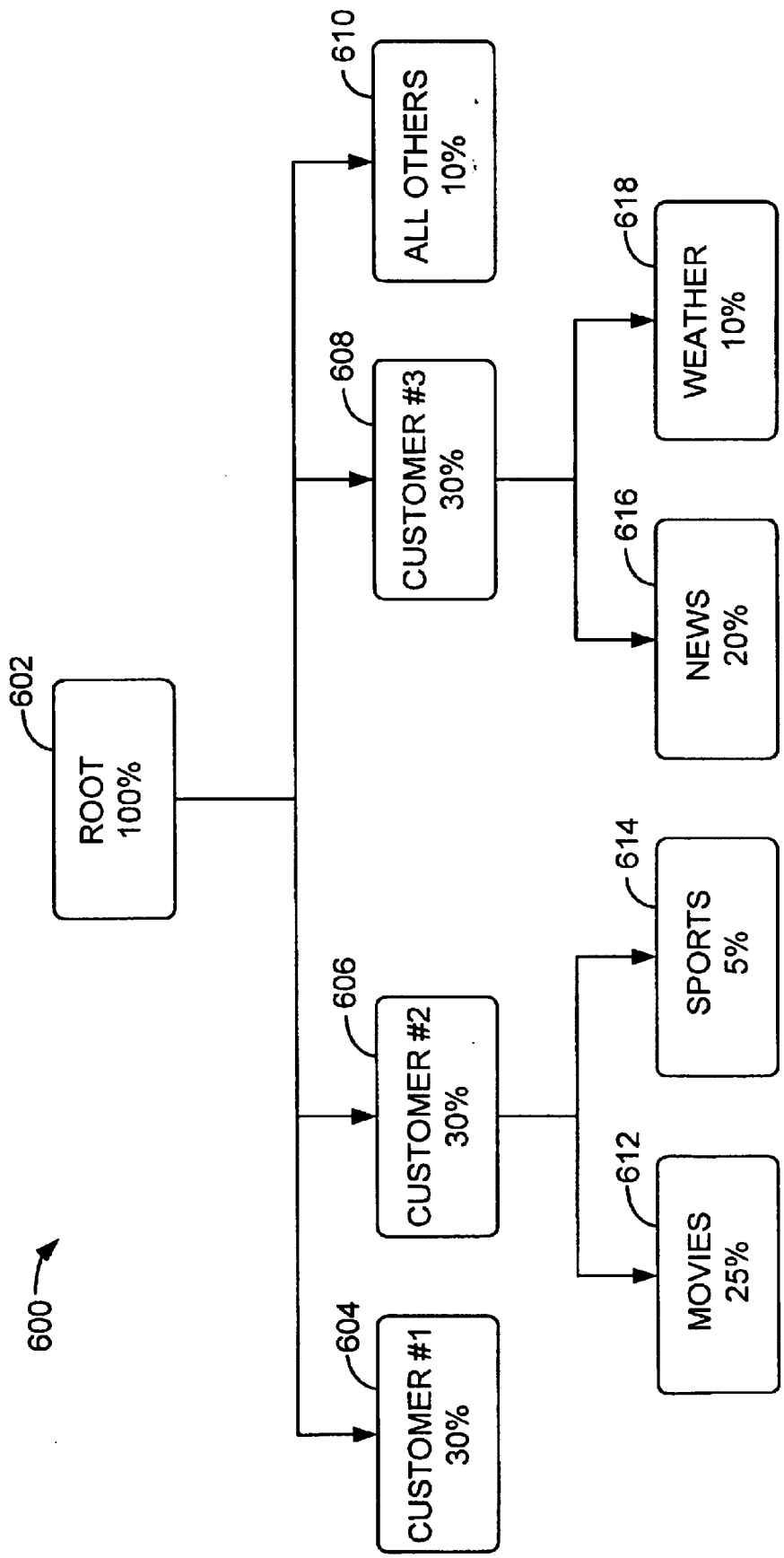
FIG. 7 shows an exemplary policy tree 600 for use with the present invention.

FIG. 7 shows an exemplary policy tree 600 for use in the present invention. The policy tree describes how the bandwidth available to the bandwidth allocation device is to be allocated among different classes of data streams. A tree structure is used to capture the hierarchical nature of the allocation, however, any type of structure or relational organization can be used to describe the bandwidth allocations. The total bandwidth available to the bandwidth allocation device is shown at the root 602 position. The total bandwidth allocated to the root for each device may be different based on network administrative decisions or capacity limitations. The bandwidth available at the root 602 is allocated among a first generation of nodes (the nodes that connect to the root), or classes, according to relative weights assigned to each node. For example, Customer 2, shown at 606, is allocated 30% of the root bandwidth. The bandwidth allocated to each of the first generation nodes is further divided among nodes one generation below. In this manner, the available network bandwidth represented at the root is hierarchically allocated to all the nodes, or classes, of the policy tree.

In one embodiment, the policy tree 600 has the root 602 and Customer 1, Customer 2 and Customer 3, shown at 604, 606 and 608 respectively, connected to the root 602. Customer 1 is allocated a maximum of 30% of the root bandwidth. Customer 2 and Customer 3 are also each allocated 30% of the root bandwidth. The remaining 10% of the root bandwidth is allocated to all other users as shown at 610. The policy tree 600 is representative of only one type of policy tree. Other types of structures or organizations may be used to define the bandwidth policies. Once the policies are defined, the system administrator has discretion to change the allocations based on a variety of operating parameters, such as the network's performance or changes in the priority of the types of data streams.

Further refinement of the bandwidth policies are shown in the policy tree 600. For example, Customer 2 and Customer 3 have their available bandwidth further allocated to more specific types of data streams. Customer 2 has its 30% of the root bandwidth allocated so that 25% of the root is available for Movies 612 and 5% of the root is available for Sports 614. Customer 3 has its 30% of the root bandwidth allocated so that 20% of the root is available for News 616 and 10% of the root is available for Weather 618. In the device 500 of FIG. 5, the allocator 512 receives allocations of the policy tree from the system administrator via the bandwidth policy input 508, and uses the allocations to negotiate transmission rates for the incoming data streams with the active plug-ins.

FIG. 8 shows a table 700 representative of control information 506 associated with the two data streams 502 and 504. The control information 506 comprises stream annotations associated with each data stream. The stream annotations provide information about the data streams that can be used to classify the data streams and to allocate bandwidth to each stream. The stream annotations can be divided into two categories, namely, required annotations and general annotations. The required annotations are those annotations that must accompany every data stream. The general annotations provide a way for a data stream to be annotated with additional information that may be useful to end users or when allocating bandwidth to the data stream.

In the embodiment of FIG. 8, exemplary stream annotations are shown for the first data stream 502 and the second data stream 504. Three categories of stream annotations are shown. The first category is a stream identifier 702 which identifies each of the data streams. By receiving the stream identifier 702, end-users can identify incoming data streams. Two other related categories, referred to as NameTAG 704 and Value 706, form pairs that annotate each of the data streams. For example, the NameTAG "mediatype" 708 has a value of "Netshow" 710 for the data stream 504. The NameTAG "mediatype" 708 has a value of "G2" 712 for the data stream 504. The sender of the data stream annotates the data stream so that all receivers on the data network may identify the exact content of data stream. Some of the data stream annotations are required so that the data stream may be identified. Other annotations are general annotations and are used by the sender to provide additional information about the data stream to end users. By using the policy tree and the stream annotations, database control structures can be formed from which the allocator 512 performs a variety of bandwidth allocation methods that result in effective utilization of the bandwidth available on the data network.

Figure 9:
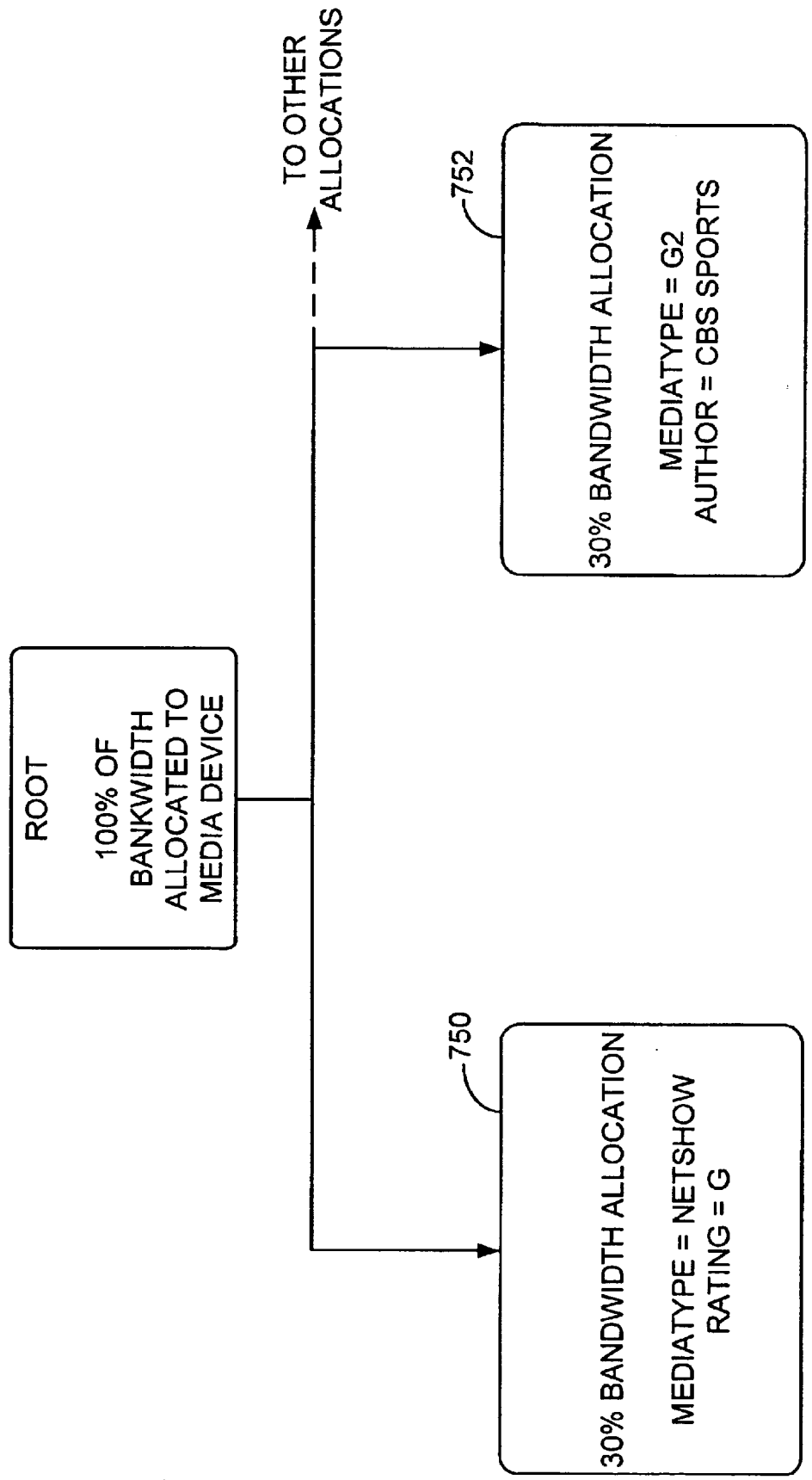
FIG. 9 shows a portion of a policy tree allocating bandwidth to selected data streams using the stream annotations.

FIG. 9 shows a portion of a policy tree wherein stream annotations are used to define bandwidth allocations. At node 750, 30% of the available root bandwidth is allocated to data streams having a Mediatype of Netshow and a Rating of G. At node 752, 30% of the available root bandwidth is allocated to data streams having a Mediatype of G2 and an Author of CBS Sports. All manner of bandwidth allocations can be made by defining control structures that use the stream annotations to allocate bandwidth to selected types, or classes, of data streams.

Referring again to FIG. 6A, incorporated in the allocator 512 is a bandwidth (BW) detector 524. The BW detector 524 can detect conditions wherein unallocated bandwidth exists. One such condition occurs when bandwidth allocated to one or more policy classes, as defined by the policy tree, goes unutilized. For example, in the policy tree 700, if no Weather data stream is being received by the device 500, then the bandwidth allocated to this policy class at block 618 is unutilized. Another condition of unallocated bandwidth occurs when additional bandwidth becomes available to the output of the media device 500 on the data network, thereby increasing the bandwidth available at the root position 602. Unallocated bandwidth detected by the BW detector 524 can be reallocated to currently existing data streams. The re-allocation of unallocated bandwidth detected by the BW detector 524 is discussed more thoroughly with reference to FIG. 12.

In one aspect of the invention, a virtual overlay network may be formed from a plurality of bandwidth allocation devices like device 500. The details of implementing an overlay network are describing in the co-pending application Ser. No. (09/323,869) and are beyond the scope of the present invention. With such an overlay architecture, the quality of service (QoS) delivered by the network can be carefully controlled through a combination of link provisioning in the underlying physical network and bandwidth provisioning across the virtual overlay network using the invention described herein. To provide QoS in a packet-switched network, approaches in the prior art universally advocate that all networking elements in a large, deployed infrastructure be upgraded to support a variety of new switching algorithms, signaling protocols, packet strategies and so forth. However, in the present invention, QoS can be delivered without changes to the existing network elements and instead requires only the addition of the new routing elements at the overlay level. When and if native networking elements become capable of delivering new forms of QoS, then the overlay abstraction can take advantage of those new devices locally. That is, the devices need not be deployed everywhere in the underlying network to aid in provision QoS. For example, data streams that are allocated to certain traffic classes within the present invention's scope could be mapped onto native network-level classes in a fashion that preserves the intended policy.

Figure 10:
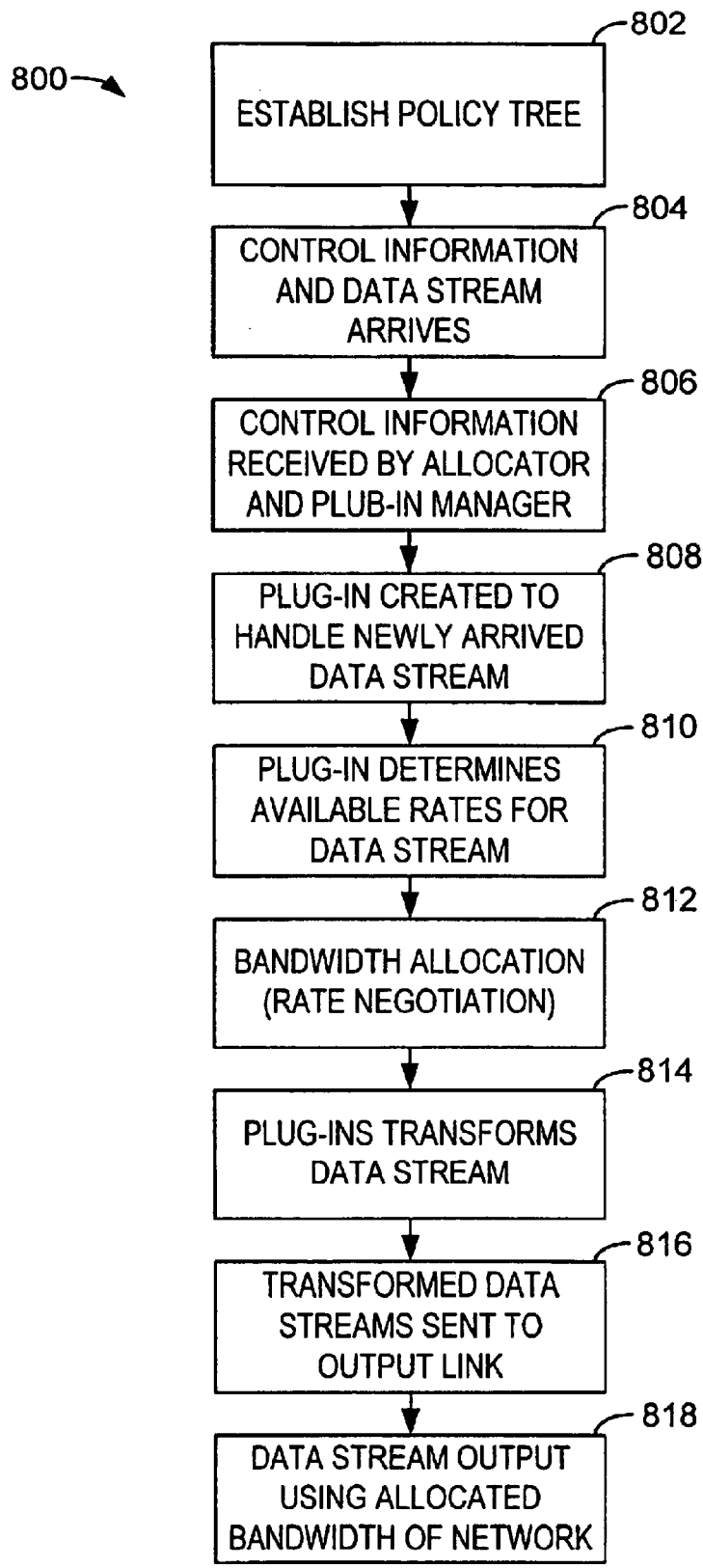
FIG. 10 shows a method 800 of operation of the device 500 of FIG. 5.

FIG. 10 shows a bandwidth allocation method 800 for use with the bandwidth allocation device 500 of the present invention. The method 800 can be used to allocate bandwidth to data streams arriving at the device 500. The method begins at block 802 wherein the system administrator establishes a policy tree, for example, the policy tree 600, and inputs the bandwidth allocations of the policy tree to the allocator 512.

At block 804 a new data stream and control information arrives at the device 500. The new data stream may comprise one data stream or may comprise multiple data streams multiplexed together. Each data stream has associated control information in the form of stream annotations similar to table 700.

At block 806 the stream annotation information is routed to the allocator 512 and the plug-in manager 514. At block 808, the plug-in manager 512 activates a plug-in for each arriving data stream. The type of plug-in activated is determined from the type of data stream arriving, indicated by the stream annotations in the control information. For example, if the control information has stream annotations that the arriving data stream contains a certain type of video data, the plug-in manager 514 activates a plug-in capable of handling that type of video data. If a data stream is a multiplexed stream containing more than one data stream, then the plug-in manager 514 activates a plug-in for each individual data stream of the multiplexed stream.

At block 810, the newly created plug-in determines one or more rates available to transmit, or forward, the data stream on the data network. For example, some data streams have only one forwarding rate, while other data streams have several forwarding rates. Different rates may result in differences in stream quality, for instance, forwarding a video stream in color versus black and white.

At block 812, the allocator 512 negotiates with each plug-in a forwarding rate for their respective data streams. In some case, as in non real-time data streams, there will exist many possible forwarding rates. In other cases, as in real-time data streams, only a few possible forwarding rates will exist that allow the data stream to be transmitted without serious degradation. Based on the policy tree and the available transmission rates indicated by the plug-in, the allocator 512 will negotiate a forwarding rate for the data stream that will be within the policy tree allocations. For example, the policy tree 600 allocates 5% of the available bandwidth to Sports 614. Assuming the bandwidth allocated to all other classes of the policy tree is fully utilized, if a sports data stream is received, the data rate will be limited to 5% of the available bandwidth. If the plug-in associated with the sports data stream indicates that a forwarding rate is possible which uses no more than 5% of the available bandwidth, then the allocator 512 will be able to allocate the bandwidth to forward the sports data stream on the network. If it turns out that the plug-in indicates that the slowest possible forwarding rate will require 7% of the available bandwidth, the allocator 512 will be unable to meet this requirement and the sport data stream will not be forwarded on the network.

At block 814 the plug-in and the allocator 512 have negotiated a forwarding rate for the data stream that is within the policy tree allocations. The plug-in begins transforming the received data stream into a transformed data stream having the negotiated data rate. To accomplish this, the plug-in may have to perform such operations as layer dropping or transcoding to adjust the incoming data stream to match the negotiated rate.

At block 816 the transformed data stream is sent to the output link 522 where all the transformed data streams are combined to form an output data stream. The output data stream contains all the input data streams transformed to utilize the available network bandwidth to conform to the policy tree. At block 818, transmission of the output data stream on the data network occurs.

Figure 11:
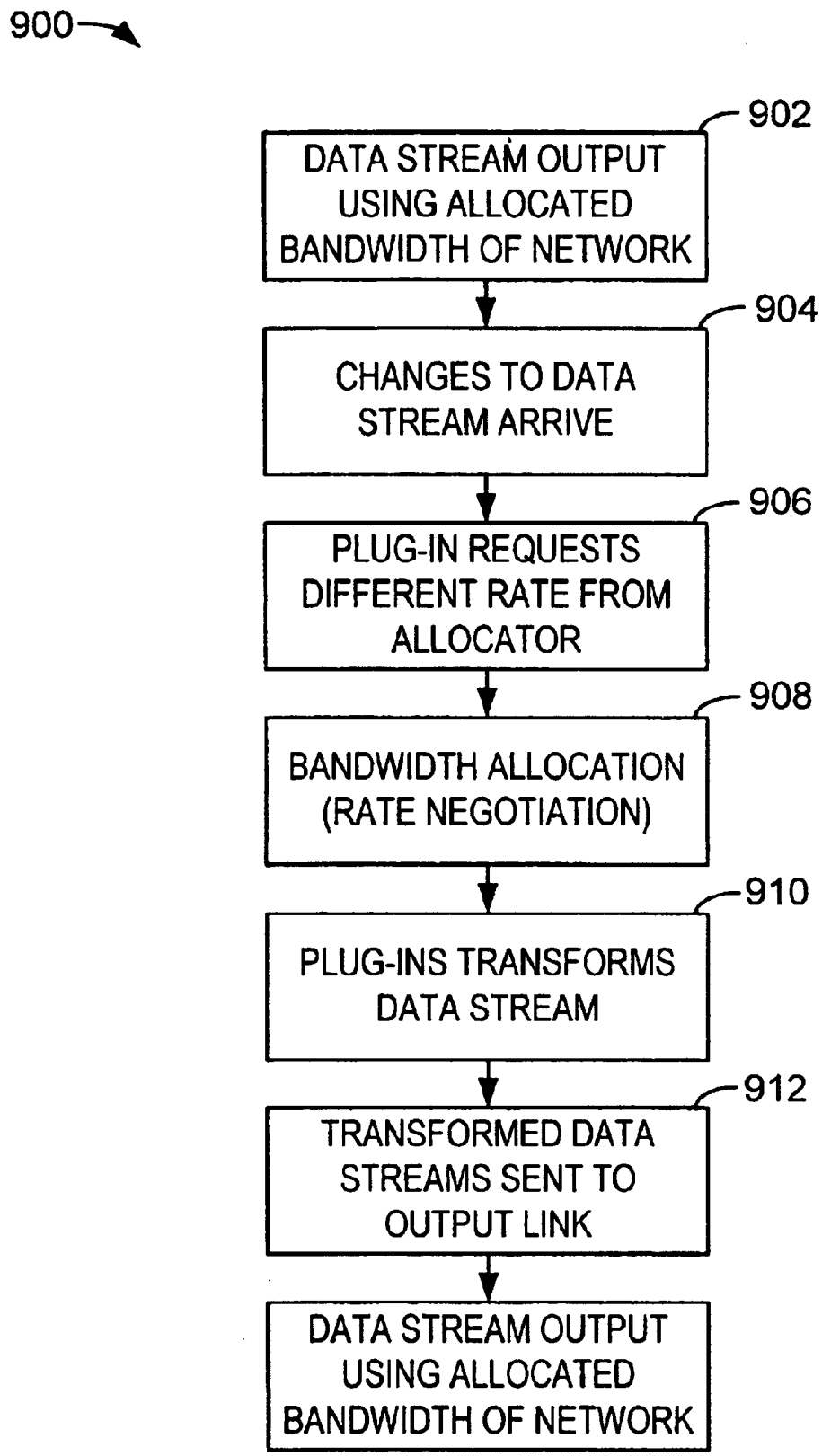
FIG. 11 shows a method 900 of operation of the device 500 of FIG. 5.

FIG. 11 shows another method 900 for use with the embodiment 500 of the present invention. Method 900 demonstrates how the allocator 512 adapts to changing conditions of an existing data stream to dynamically re-allocate the bandwidth of the data network.

At block 902, a plug-in is currently forwarding a received data stream on the network using a, previously negotiated for, allocated portion of the available bandwidth. At block 904, a change occurs to the data stream affecting the bandwidth requirements for the data stream. For example, the minimum allowable forwarding rate for the data stream may be increased. The stream annotations associated with the data stream reflect the change.

At block 906, the plug-in determines the new forwarding rates available for the received data stream and informs the allocator 512 of the new rates. At block 908, the allocator determines if the stream can be forwarded at the existing rate or if a new rate should be negotiated. If a new rate is required, the plug-in and the allocator 512 renegotiate a new rate for the data stream taking into account the new set of available rates. A new forwarding rate for the data stream will be negotiated, as long as the new rate does not exceed the allocations defined by the policy tree for the class represented by the data stream.

At block 910, the plug-in begins transforming the data stream to the newly negotiated rate. At block 912, the newly transformed data stream is sent to the output link 522 and at block 914 the transformed data stream is transmitted on the data network. Thus, using the device 500 of the present invention, it is possible to dynamically allocate the bandwidth of the data network to accommodate changing forwarding rate requirements of an existing data stream.

Figure 12:
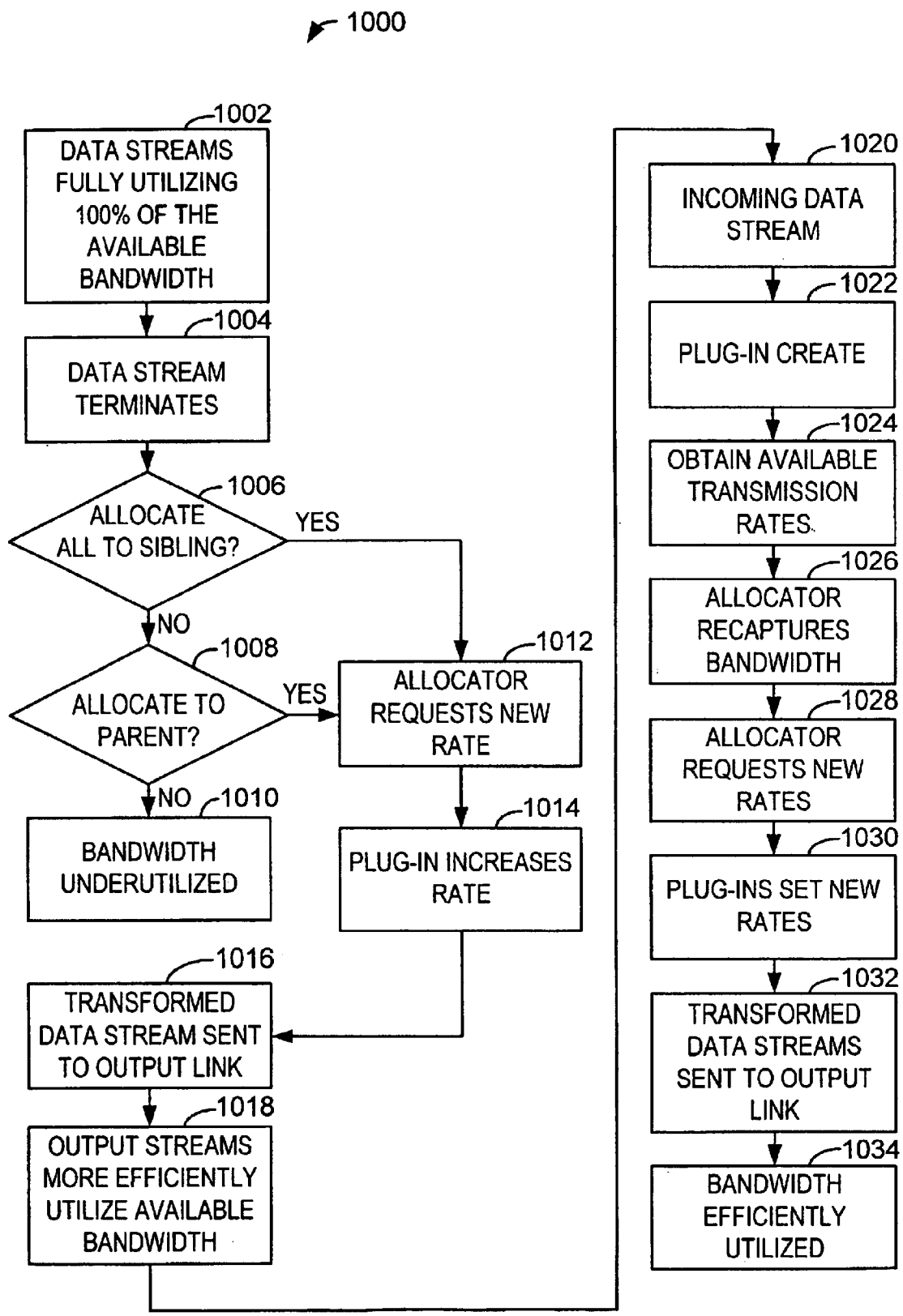
FIG. 12 shows a method 1000 of operation of the device 500 of FIG. 5.

FIG. 12 shows another method 1000 for use with the device 500 of the present invention. Method 1000 demonstrates how the allocator 512 adapts to changing network conditions to dynamically allocate the bandwidth of the data network to avoid unallocated bandwidth conditions. Unallocated bandwidth conditions exist when the bandwidth allocations of the policy tree are not fully utilized. For example, referring to the policy tree 600 of FIG. 7, the bandwidth allocation for Customer 3 is 30%, wherein the News 616 allocation is 20% and the Weather 618 allocation is 10%. If no Weather data stream exists, the 10% allocation will be unused, thereby creating an unallocated bandwidth condition. To avoid this, the allocator 512 reallocates the unallocated bandwidth to other data streams. The method 1000 demonstrates how the allocator dynamically re-allocates available bandwidth when data streams begin, end or when a data stream otherwise changes its bandwidth requirements.

At block 1002, an initial condition exists wherein received data streams fully utilize the available network bandwidth according to the allocations of the policy tree 600. At block 1004, a data stream terminates, for example, the Weather 618 stream terminates leaving 10% of the available bandwidth unallocated. At block 1006, the allocator 512 attempts to dynamically reallocate the unused bandwidth. The allocator 512 knows the available rates for all active plug-ins as a result of the initial negotiation processes. The allocator 512 attempts to determine a plug-in that can use a higher forwarding rate without exceeding the available bandwidth. The allocator 512 first looks to allocate the unallocated bandwidth to data streams that are siblings to the terminated data stream. In this situation, the News 616 data stream is a sibling data stream. If the allocator can allocate all the unallocated bandwidth to the sibling data stream, then the method proceeds to block 1012, otherwise the method proceeds to block 1008.

At block 1008, the allocator 512 was unable to allocate all of the unallocated bandwidth to a sibling class, so the allocator looks to allocate the unallocated bandwidth to parent class according to the policy tree 600. For example, Customer 2 is a parent class to the Weather data stream.

At block 1010, if the allocator 512 fails to find a sibling or parent to allocate the unallocated bandwidth to, the unallocated bandwidth will remain unused and the network will be underutilized.

At block 1012, the allocator 512 has found one or more data streams, associated with a sibling and/or parent class, that can use the unallocated bandwidth. Since the allocator knows the available transmission rates for all the data streams, the allocator sends an instruction to the respective plug-ins to use new transmission rates to forward their data streams. The new forwarding rates are selected from the available rates known to exist for each data stream. If a data stream is instructed to use a higher forwarding rate, it may exceed its respective bandwidth allocation defined by the policy tree. However, this condition is desirable to allocate unallocated bandwidth and improve network utilization.

At block 1014, the plug-in responds to the instructions from the allocator 512 by transforming the data stream to the new forwarding rate. At block 1016, the transformed data streams are sent to the output link 522 and at block 1018 the output link transmits the data streams on the data network. As a result of the re-allocation process, the unallocated bandwidth of the data network is eliminated or reduced and the network operates more efficiently.

It will be obvious to one with skill in the art that the unallocated bandwidth may be re-allocated to more than one plug-in and that the resulting bandwidth allocations may be different from the allocations defined by the policy tree 600. As more data streams arrive or terminate, or as existing data streams change their requirements, the bandwidth may be re-allocated again. Thus, the method 1000 further demonstrates how changing network conditions trigger another bandwidth re-allocation to conform to the policy tree and thereby keep the bandwidth efficiently utilized.

At block 1020, after the unallocated bandwidth has been allocated to existing data streams, a new incoming data stream arrives at device 500. The new incoming data stream contains control information that is received by the allocator 512 and the plug-in manager 514. At block 1022, the plug-in manager 514 creates a plug-in to handle the new data stream. At block 1024, the plug-in determines from the stream annotations what forwarding rates are available and provides these rates to the allocator 512.

At block 1026, the allocator determines how to recapture some or all of the bandwidth that was previously unallocated, so that the new data stream can be allocated bandwidth in conformance with the policy tree. For example, the policy tree 600 specifies 10% of the bandwidth for Weather 618 data. If a new Weather data stream arrives, the previously unallocated bandwidth will be reacquired so that the new Weather data can be allocated 10% in accordance with the policy tree 600.

At block 1028, the allocator 512 requests new forwarding rates for all plug-ins that are affected by the re-allocation. The new forwarding rates are selected from the known forwarding rates previously determined by each plug-in. At block 1030; the affected plug-ins transform their respective data streams to the requested forwarding rates. At block 1032 the data streams, including the new data stream, are sent to the output link 522 for output on the data network at the requested rates. At block 1034, as a result of the reallocation, the recovered bandwidth provides the new data stream its portion of the available network bandwidth as defined by the policy tree.

Although the dynamic bandwidth re-allocation helps to increase the efficiency of the network, excessive re-allocation can be detrimental. For example, a streaming video player can only take advantage of increased bandwidth by switching layers, an event that can require a several second interruption in viewing. To make it worthwhile to disrupt a viewing session to switch layers, the video player needs an explicit indication that there is enough unallocated bandwidth for a layer change and that the unallocated bandwidth will be available for awhile. Therefore, bandwidth reallocations to a few plug-ins should not trigger changes to every plug-in, and bandwidth reallocations should not occur too often.

Figure 13:
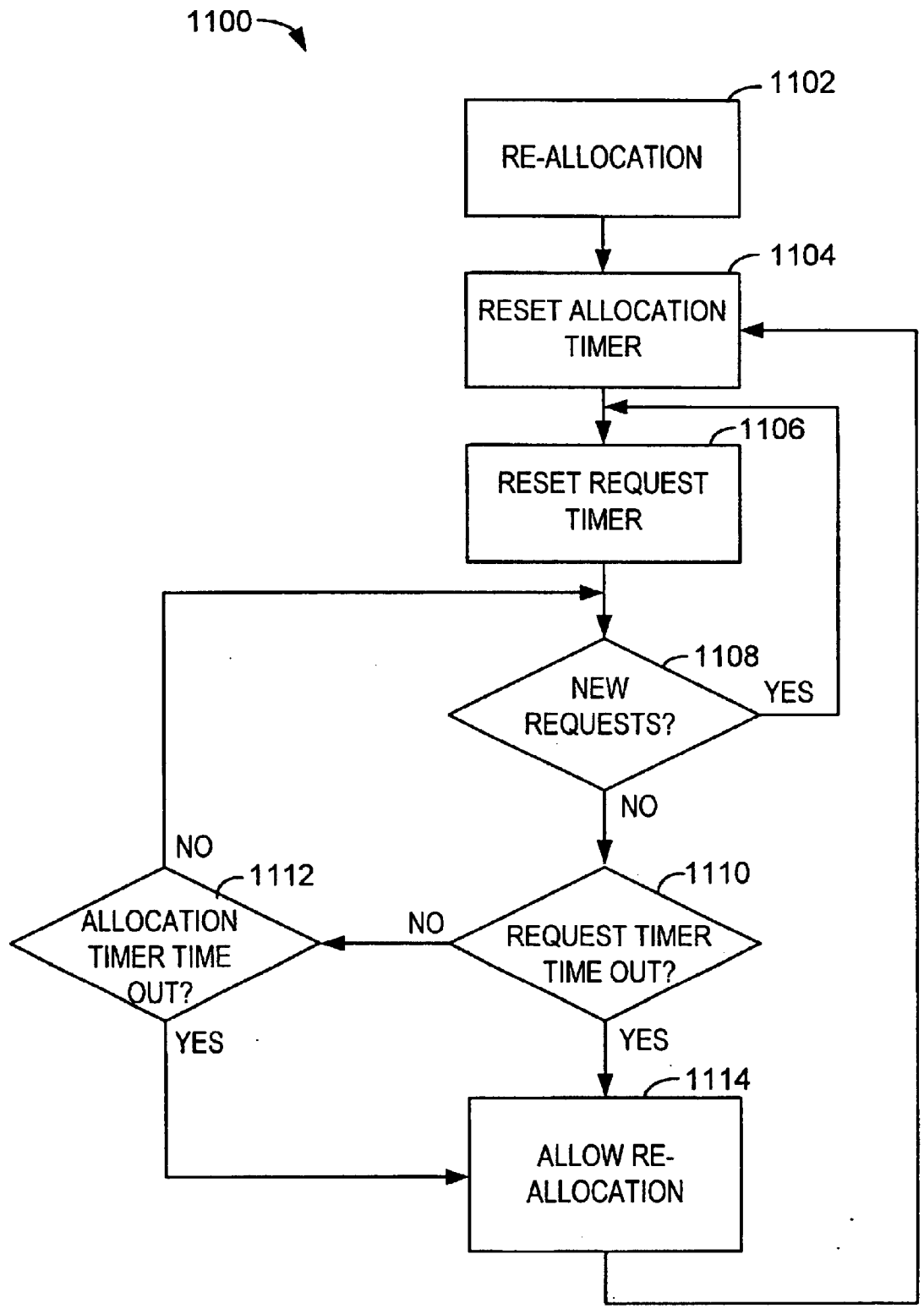
FIG. 13 shows a method 1100 of operation of the device 500 of FIG. 5.

FIG. 13 shows a method 1100 for use with the device 500 of the present invention. The method 1100 provides a way to schedule bandwidth reallocations so that the reallocations are not done too frequently. The method 1100 also prevents a noisy plug-in from disrupting the reallocation process. A noisy plug-in is a plug-in that repeatedly requests forwarding rate changes.

At block 1102, a reallocation of the network bandwidth occurs. The reallocation may be due to various reasons, such as to correct an unallocated bandwidth condition or to accommodate a new data stream. At block 1104, a reallocation timer resets and begins timing the interval between reallocations. At block 1106, a plug-in request timer resets and begins timing the interval between plug-in requests. The plug-in request can be a request to begin or end a data stream, or to change the forwarding rate of an existing data stream. At block 1108, a check occurs for new plug-in requests. If there are new plug-in requests, the allocator 512 handles the request and the method 1100 proceeds to block 1106 where the request timer is reset.

At block 1110, a check occurs to determine if the request timer has timed out. The timeout occurs if no new plug-in requests are received for a selected time duration. The selected time duration is determined by the system administrator. If the request timer has not timed out then the method 1100 proceeds to block 1112. If the request timer has timed out then the method 1100 proceeds to block 1114.

At block 1114, the allocator performs a reallocation of the available network bandwidth. After the reallocation, the method 1100 proceeds to block 1104 where the allocation timer is reset. At block 1112 a check occurs to see if the allocation timer has timed out. The allocation timer indicates the duration between allocations. The timeout duration is determined by the system administrator. If the allocation timer has not timed out then the method 1100 continues at block 1108 by checking for new plug-in requests. If the allocation timer has timed out, the method proceeds to block 1114 where the allocator 512 performs a reallocation. At the end of the reallocation at block 1114, the method 1100 proceeds to block 1104 where the reallocation timer is reset.

The allocator uses selectable time intervals for the plug-in request timer and the reallocation timer to adjust how often the available bandwidth of the data network is reallocated. By using the request timer, the allocator ensures that the network data streams are stable before beginning a reallocation process. By using the reallocation timer, the allocator can force a reallocation regardless of the state of the data streams, so that a noisy plug-in can't disrupt the bandwidth reallocation process by preventing timeout of the plug-in request timer.

As will be apparent to those of skill in the art, variations in the above described apparatus methods for allocating the bandwidth of the data network are possible without deviating from the scope of the present invention. Embodiments of the present are suitable for use in all network environments wherein efficient allocation of network bandwidth is desired. Accordingly, the disclosures and descriptions herein are intended to be illustrative, but not limiting, of the scope of the invention which is set forth in the following claims.

What is claimed is:

1. Apparatus for allocating the bandwidth of a data network to a data stream having an associated data class, the apparatus comprising:

a stream processor, having logic to receive the data stream and to determine a plurality of acceptable transmission rates for the data stream;

an allocator, coupled to the stream processor and having logic to negotiate a transfer rate for the data stream with the stream processor, wherein the transfer rate is a selected one of the plurality of acceptable transmission rates and is limited to a portion of the bandwidth apportioned to the data class associated the data stream; and an output coupled to the stream processor, having logic to receive the data stream and transmit the data stream on the data network at the negotiated transfer rate.

2. The apparatus of claim 1 further comprising a manager having logic to activate the stream processor based on stream annotations associated with the data stream.

3. The stream processor of claim 1 further comprising a transformer having logic to transform the data stream to the negotiated transfer rate.

4. The allocator of claim 1 further comprising bandwidth allocations, wherein the bandwidth allocations apportion the bandwidth to a plurality of data classes.

5. The apparatus of claim 1 wherein the allocator further comprises a detector having logic to detect unallocated bandwidth on the data network and logic to negotiate with the stream processor a new transfer rate for the data stream that is a selected one of the plurality of acceptable transmission rates, wherein the new transfer rate utilizes at least a portion of the unallocated bandwidth.

6. The apparatus of claim 1 wherein the stream processor further comprises logic to determine a new plurality of acceptable transmission rates for the data stream based on changes to the data stream.

7. A method of operating a data network to allocate bandwidth of the data network to a data stream, comprising:

annotating the data stream with stream annotations;

transmitting the data stream on the data network;

establishing a policy tree that specifies apportionment of the bandwidth of the data network to a plurality of data classes;

receiving the data stream;

determining a plurality of acceptable transmission rates for the data stream;

negotiating a transfer rate for the data stream, wherein the transfer rate is a selected one of the acceptable transmission rates and is limited to the bandwidth specified by the policy tree for the data class associated with the stream annotations of the data stream;

transforming the data stream to the negotiated transfer rate; and transmitting the data stream on the data network at the negotiated transfer rate.

8. The method of claim 7 wherein the step of determining comprises steps of:

receiving the stream annotations of the data stream; and activating a stream processor based on the stream annotations to receive the data stream and to determine the plurality of acceptable transmission rates for the data stream.

9. The method of claim 7 wherein the transfer rate is a first transfer rate and the method further comprises steps of:

determining unallocated bandwidth on the data network;

negotiating a second transfer rate for the data stream, wherein the second transfer rate is a selected one of the plurality of acceptable transmission rates and uses at least a portion of the unallocated bandwidth;

transforming the data-stream to the negotiated second transfer rate; and transmitting the data stream on the data network at the negotiated second transfer rate.

10. The method of claim 9 wherein the data stream is a first data stream, the stream annotations are first stream annotations and the data class is a first data class, the method further comprises steps of:

annotating a second data stream with second stream annotations;

determining a plurality of acceptable transmission rates for the second data stream;

negotiating a first transfer rate for the first data stream, wherein the first transfer rate is a selected one of the acceptable transmission rates for the first data stream and is limited to the bandwidth specified by the policy tree for the data class associated with the first data stream;

negotiating a second transfer rate for the second data stream, wherein the second transfer rate is a selected one of the acceptable transmission rates for the second data stream and is limited to the bandwidth specified by the policy tree for the data class associated with the second data stream;

transforming the first data stream to the negotiated first transfer rate and the second data stream to the negotiated second transfer rate; and transmitting the first data stream and the second data stream on the data network at the negotiated transfer rates.

11. A data network for transmitting a data stream, comprising:

a first node having logic to annotate the data stream with stream annotations that define a data class and having logic to transmit the data stream and the stream annotations on the data network;

a second node couple to the first node and having logic to receive the data stream and the stream annotations;

a stream processor coupled to the second node having logic to receive the data stream and determine a plurality of acceptable transmission rates;

an allocator coupled to the stream processor, the allocator having a policy tree that specifies apportionment of a bandwidth of the data network to a plurality of data classes, and wherein the allocator further comprises logic to negotiate a transfer rate for the data stream wherein the transfer rate is a selected one of the plurality of acceptable transmission rates and is limited to the bandwidth allocated by the policy tree to the data class defined by the stream annotations;

an output coupled to the stream processor and having logic to transmit the data stream on the data network at the negotiated transfer rate; and a third node couple to the second node and having logic to receive the data stream transmitted by the output.

12. The stream processor of claim 11 further comprising logic to transform the data stream to the negotiated transfer rate.

13. The allocator of claim 11 further comprising a detector having logic to detect unallocated bandwidth of the data network and wherein upon detected unallocated bandwidth, the detector has logic to activate negotiation for a new transfer rate for the data stream, wherein the new transfer rate is a selected one of the plurality of acceptable transmission rates that uses at least a portion of the unallocated bandwidth.

14. A method for allocating bandwidth of a data network to a plurality of data streams, comprising:

specifying apportionment of the bandwidth to a plurality of data classes;

receiving a plurality of data streams wherein each data stream has at least one attribute that associates the data stream with one of the data classes;

negotiating a transfer rate for each data stream, wherein the transfer rate is limited to the bandwidth apportioned to the data class associated with each data stream; and transmitting the data streams on the data network at the negotiated transfer rates;

wherein the step of receiving comprises steps of:

receiving stream annotations associated with each of the data streams; and activating a plug-in to receive each data stream, wherein the type of plug-in is determined from the stream annotations.

15. A method for allocating bandwidth of a data network to a plurality of data streams, comprising:

specifying apportionment of the bandwidth to a plurality of data classes;

receiving a plurality of data streams wherein each data stream has at least one attribute that associates the data stream with one of the data classes;

negotiating a transfer rate for each data stream, wherein the transfer rate is limited to the bandwidth apportioned to the data class associated with each data stream; and transmitting the data streams on the data network at the negotiated transfer rates;

wherein the step of negotiating comprises steps of:

determining a plurality of acceptable transmission rates for each data stream; and negotiating a transfer rate for each data stream, wherein the transfer rate is a selected one of the acceptable transmission rates and is limited to the bandwidth apportioned to the data class associated with each data stream.

16. A method for allocating bandwidth of a data network to a plurality of data streams, comprising:

specifying apportionment of the bandwidth to a plurality of data classes;

receiving a plurality of data streams wherein each data stream has at least one attribute that associates the data stream with one of the data classes;

negotiating a transfer rate for each data stream, wherein the transfer rate is limited to the bandwidth apportioned to the data class associated with each data stream; and transmitting the data streams on the data network at the negotiated transfer rates;

wherein the transfer rate is a first transfer rate and the method further comprises steps of:

determining unallocated bandwidth on the data network;

negotiating a second transfer rate for at least one data stream, wherein the second transfer rate uses the unallocated bandwidth;

transforming the at least one data stream to the negotiated second transfer rate; and transmitting the at least one data stream on the data network at the second transfer rate.

17. The method of claim 16 further comprising:

receiving at least a second data stream having an associated data class;

negotiating a third transfer rate for the at least one data stream, wherein the third transfer rate is limited to the bandwidth apportioned to the data class associated with the at least one data stream;

negotiating a fourth transfer rate for the at least second data stream, wherein the fourth transfer rate is limited to the bandwidth apportioned to the data class associated with the at least second data stream; and transmitting on the data network, the at least one data stream at the third transfer rate and the at least a second data stream at the fourth data rate.

* * * * *